Aug. 22, 1933.   T. BROWN   1,923,253
AGRICULTURAL IMPLEMENT
Filed April 28, 1930
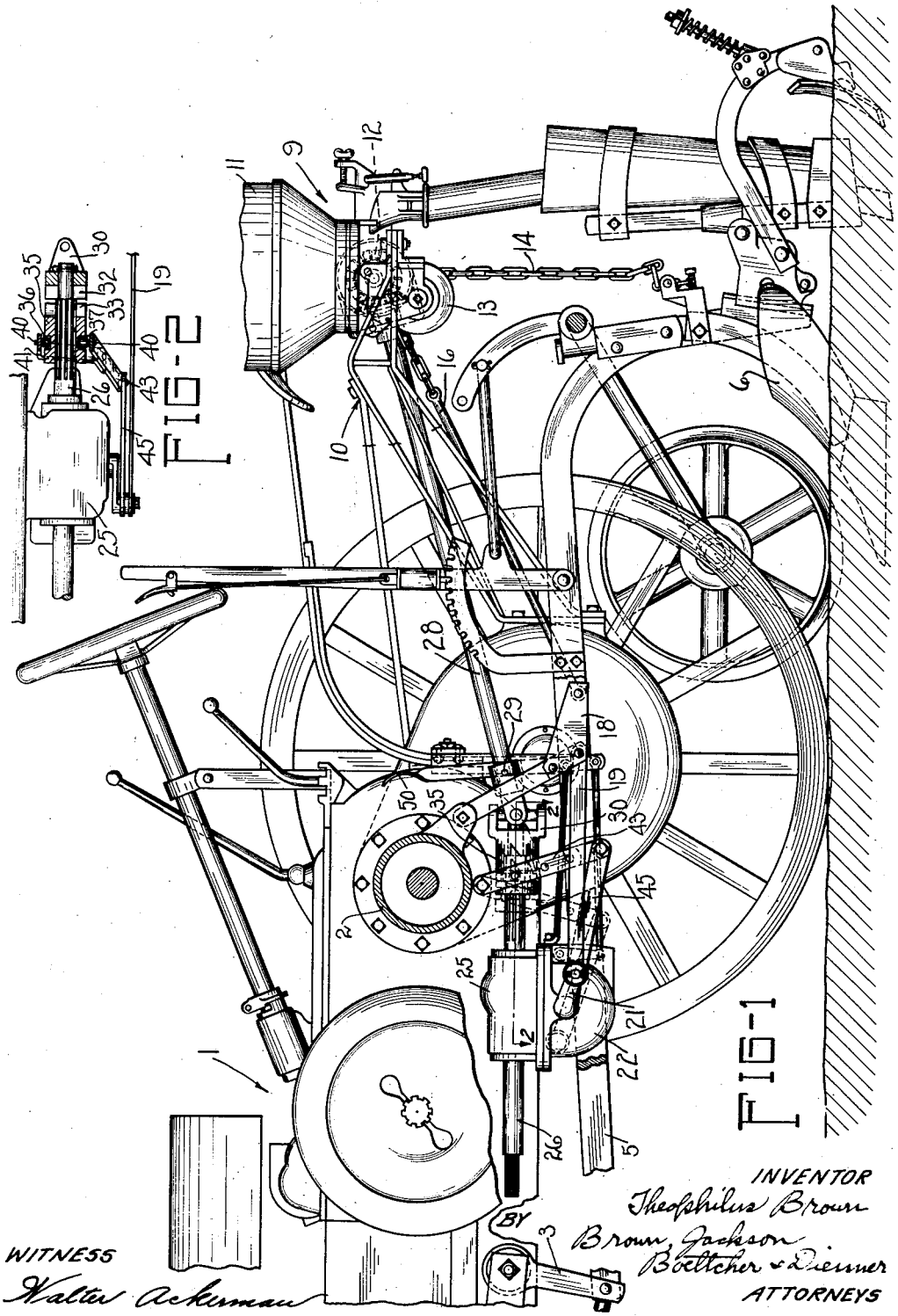
INVENTOR
Theophilus Brown
BY Brown, Jackson,
Boettcher & Diemer
ATTORNEYS
WITNESS
Walter Ackerman Patented Aug. 22, 1933

1,923,253

UNITED STATES PATENT OFFICE 1,923,253

AGRICULTURAL IMPLEMENT

Theophilus Brown, Moline, Ill., assignor to Deere & Company, Moline, Ill., a Corporation of Illinois Application April 28, 1930. Serial No. 447,880

17 Claims. (Cl. 97—50)

The present invention relates generally to agricultural implements and more particularly to tractor drawn outfits where the tractor is provided with a power take-off for operating certain of the machinery and with a power lift of the usual type.

More specifically, my invention is concerned with the provision of a clutch in the power take-off connection and the provision of simple and efficient means whereby the power lift device of the tractor is utilized to actuate this clutch.

The majority of tractors in use today are usually adapted for a wide variety of purposes, such as pulling or propelling plows, cultivators, binders and the like and they are usually provided with some form of power take-off connection whereby the power of the tractor motor may be utilized to drive the mechanism of the propelled machine. These tractors are also usually provided with some form of power lift, usually of the half-revolution type where a crank arm is swung from one position to an opposite position every time the power lift is tripped. Prior to my invention it has been necessary to provide some form of clutch means in the mechanism of the propelled implement whereby the latter may be thrown out of operation at certain times, as when turning around at the end of the row or when moving from one field to another. I propose to dispense with this throw-out-clutch and its connections, which in some types of implements are relatively complicated on account of the fact that the implement may be removed quite a distance from the position of the operator on the tractor, by providing a simple clutch mechanism associated directly with the power take-off and having a short simple connection with the power lift means whereby the clutch may be operated by simply tripping the power lift. Thus, if the implement propelled by the tractor includes earth working tools or the like which are adapted to be moved to and from operating position by the power lift device, the clutch in the power take-off connection is automatically operated simultaneously with the raising and lowering of the earth working tools; and if the implement operated by the tractor does not include any earth working tools the power lift of the tractor affords a convenient and simple means for throwing the clutch in the power take-off connection into and out of operation, it being noted that in the use of my invention in this arrangement a part, that is, the power lift, is made use of which would otherwise be idle. Since the power lift device is usually so arranged as to be a permanent part of the tractor the tripping means for the power lift is always convenient for actuation by the operator regardless of the particular implement associated at any one time with the tractor, whereas where the throw-out clutch is a part of each implement various expedients must be employed in order to place the control of the same within convenient reach of the operator. My invention, therefore, makes for a simpler and less expensive outfit, while, at the same time, providing means for more convenient operation thereof.

Other objects and advantages of my invention will be apparent to those skilled in the art after a consideration of the following detailed description taken in conjunction with the accompanying drawing, in which:

Figure 1 is a side elevation, certain parts of the tractor being shown in section so as to enable certain parts of my invention to be more clearly shown; and Figure 2 is a fragmentary top plan view of the power lift and the power take-off, certain parts of the latter being shown in section to more clearly illustrate my invention.

The reference numeral 1 indicates, as a whole, the tractor having a drive shaft housing 2 and a front draft connection 3 which receives the front ends of the beams 5 of earth working tools 6 adapted to be propelled by the tractor at the rear thereof. Seed selecting and depositing mechanism 9 is shown in Figure 1 as carried at the rear of the tractor by means of brackets 10. These brackets 10 provide a framework for the support of the seed hoppers 11 and seed selecting mechanism 12 as is well understood in the art. Sheaves 13 are carried by the framework 10 and are adapted to have trained thereover cables or chains 14 connected at one end to the earth working tools 6 and at the other end to a link or rod 16 connected at its forward end to a pendant link 18 pivoted at its upper end to the drive housing 2 and having a forwardly extending link connection 19 to the power lift crank arm 21 forming a part of the usual power lift device 22 secured to the tractor 1 in the usual manner.

Thus when the power lift 22, as shown in Figure 1, is tripped the power lift crank arm 21 swings forwardly to the position shown in dotted lines thereby exerting a pull on the link connection 19 and swinging the pendant link 18 which, through rod 16, pulls the chain 14 upwardly to thereby lift the earth working tools 6 connected thereto.

The tractor 1 is shown in Figure 1 as provided with the usual form of power take-off 25 having a power take-off shaft 26 extending forwardly and rearwardly thereof and adapted to be driven by the power of the tractor motor. The seed selecting mechanism 12 is adapted to be driven from the power take-off shaft 26 in the following manner. Extending between the seed selecting mechanism 12 and the tractor is a shaft 28 having secured thereto at its forward end one part of a universal joint 29, the other part 30 thereof being loosely journaled upon the rearward end of the power take-off shaft 26, as best shown in Figure 2. The universal joint part 30 is shown as provided with clutch teeth 32 which are adapted to cooperate with correspondingly formed clutch teeth 33 provided on the clutch part 35 splined onto the power take-off shaft 26.

The clutch part 35 is thus slidable along but rotatable with the power take-off shaft 26 and for the purpose of moving the clutch part into and out of operative engagement with the other clutch part 30, which also forms a part of the universal joint, I provide an annular groove 37 in the part 35 and in which is positioned the clutch collar 36. The clutch collar or ring 36 is suitably connected, as by bearing trunnions 40 and a strap 41, to an arm 43 pivoted for swinging movement fore and aft of the tractor to the drive housing 2. A link 45 connects the lower end of the arm 43 to the power lift connections at the power lift crank arm 21, see Figure 2.

While this is the preferred form of connection between the arm 43 and the power lift connections it is obvious that other means may be employed, as for example, a pin and slot connection may be had between the arm 43 and the link connection 19 directly, if desired.

The operation of my invention in connection with the particular implement illustrated in Figure 1 will now be described. With the earth working tools 6 in operative position and the seed selecting and depositing mechanism connected through the clutch 35 to the power take-off shaft 26, the operation of a tractor 1 will propel the implement and at the same time drive the seed selecting mechanism through the power take-off connections and the shaft 28. When the operator reaches the end of the row and it is desired to raise the earth working tools from engagement with the ground, he operates the power tripping mechanism 50 which causes the power lift crank arm 21 to swing forwardly by the power of the tractor motor and which raises the tools 6 and at the same time draws the clutch part 35 out of engagement with the part 30 whereby the power drive connection to the seed selecting mechanism is interrupted. When the outfit is aligned with the next row and it is desired to begin operations again, all that it is necessary to do is to again trip the power lift device and the power lift crank arm is then swung back to the full line position shown in Figure 1 which thereupon restores the drive connection through the clutch 35 to the seed selecting mechanism 12 and lowering the tools 6 to their furrow opening position.

While my invention is described above in connection with a type of implement having both a driven mechanism and earth working tools, it will be obvious that other forms of implements may be used and all the advantages of the use of my invention secured. For instance, my invention may have greater application in connection with a towed implement such as a binder which is driven through the power take-off of the tractor and which implement has no connection with the power lift of the tractor for performing any lifting operation. In such an arrangement, the power lift operated clutch merely comprises means for interrupting and restoring operation of the driving connections between the power take-off and the mechanism of the binder or other implements. Thus, where prior to my invention the power lift would not be utilized at all, I employ the power lift as a means for operating the clutch in the power take-off shaft. When the operator wishes to stop the operation of the binder mechanism, he merely trips the regular trip lever 50 of the power lift by which the clutch part 35 is then thrown out of engagement with the part 30. When the operator wishes to start the operation of the binder mechanism, he again operates the trip 50 of the power lift, causing the engagement of the clutch part 35 with the part 30, thus restoring operative connection in the power drive from the power take-off shaft to the binder mechanism.

The planter and binder are merely illustrative of the type of implements with which my invention has its greatest application; obviously other types of implements may be employed with a tractor equipped with my invention. My invention is therefore, not to be limited to the specific modifications shown and described but it is apparent to those skilled in the art that widely different means and implements may be employed in the practice of the broader aspects of my invention. What I claim, therefore, and desire to secure by Letters Patent is:

1. The combination with a tractor having a power take-off of an implement adapted to be driven from the power take-off, connections between the implement and the power take-off including a clutch, and means connected to operate said clutch and adapted to be optionally driven from said power take-off to optionally engage and disengage said clutch.

2. In combination, a tractor having a motor and a power take-off, an implement adapted to be driven from said power take-off, connections including a clutch mounted adjacent the power take-off between the latter and the implement, and power driven means operated from the power take-off for actuating the clutch.

3. In combination, a tractor having a motor and a power take-off, an implement adapted to be driven from said power take-off, connections including a clutch and a shaft extending from the clutch to the implement, and power actuated means mounted on the power take-off and adapted to be driven thereby to operate the clutch to connect and disconnect the power from the implement.

4. A machine of the class described comprising, in combination, a tractor having a power lift and a power take-off, an implement propelled by the tractor and driven from the power take-off, and means operated by the power lift to interrupt the driving connection between the power take-off and the implement.

5. A machine of the class described comprising, in combination, a tractor having a power take-off and a power lift, an implement adapted to be driven from the power take-off, clutch means connecting the implement to the power take-off, and means operatively connecting the clutch to the power lift whereby the clutch may be thrown into and out of operation by operating the power lift.

6. A machine of the class described comprising, in combination, a tractor having a power lift device operable at will and a power take-off including a rotatable shaft, an implement connected to the tractor and including mechanism having a rotatable shaft adapted to be driven by the power take-off shaft, connections between the shafts including a clutch, and link means operatively connecting the power lift to the clutch to operate the same.

7. A machine of the class described comprising, in combination, a tractor having a power lift device operable at will and a power take-off including a rotatable shaft, an implement connected to the tractor and including mechanism having a rotatable shaft adapted to be driven by the power take-off shaft, connections between the shafts including a clutch, one part of which is slidably but non-rotatably mounted on the power take-off shaft, and link means operatively connecting the power lift to said slidable clutch part whereby the clutch may be thrown into and out of operation by operating the power lift device.

8. A machine of the class described comprising, in combination, a tractor having a power lift device and a power take-off including a rotatable shaft, an implement connected to the tractor and including mechanism having a rotatable shaft adapted to be driven by the power take-off shaft, connections between the shafts including a clutch, one part of which is slidably but non-rotatably mounted on the power take-off shaft and the other part of which is rotatably but non-slidably mounted on said power take-off shaft, the one part of said clutch having an annular groove and a collar rotatably seated therein, a link pivoted to the frame of the tractor and connected to the collar, and means connecting the link with the power lift of the tractor so that when the power lift is actuated the link will rock to shift said one clutch part relative to the other part.

9. A machine of the class described comprising, in combination, a tractor having a power take-off including a rotatable shaft, an implement connected to the tractor and including mechanism having a rotatable shaft adapted to be driven by the power take-off shaft, connections between the shafts including a clutch, comprising two cooperating parts, and a universal joint, one of said clutch parts being splined to the power take-off shaft and the other clutch part forming one part of the universal joint, and power lift means operable at will to shift the splined clutch part relative to the other clutch part, when operated.

10. A machine of the class described comprising, in combination, a tractor having a power take-off and a power lift, an implement adapted to be driven from the power take-off and including tools adapted to be raised and lowered by said power lift, clutch means connecting the implement to the power take-off, and means operatively connecting the clutch to the power lift whereby the clutch will be thrown into and out of operation simultaneously with the raising or lowering of the tools.

11. An agricultural machine comprising, in combination, a tractor having a power lift and a power take-off, an implement adapted to be driven from the power take-off and having earth working means and means connecting the latter to the power lift whereby the earth working means may be raised and lowered by the power lift, and clutch means actuated by said connecting means and operable to control the connection between the implement and the power take-off.

12. An agricultural machine comprising, in combination, a tractor having a power lift and a power take-off, an implement adapted to be driven from the power take-off, earth working means having a draft connection to the tractor and connected to the power lift to be moved into and out of operative position thereby, and clutch means operated by the power lift when the earth working means is shifted to interrupt and restore the driving connection between the implement and the power take-off.

13. A machine of the class described comprising, in combination, a tractor having a partial revolution power lift clutch and a power take-off means, an implement propelled by the tractor and driven from the power take-off means, and means operated by the power lift clutch to control the driving connection between the power take-off means and the implement.

14. In combination, a tractor having a half revolution power lift means and a power take-off means, an implement propelled by the tractor and driven from the power take-off means, and means controllable by the power lift means for rendering the power take-off means operable to transmit power to the implement, said power lift means being operable at will and deriving its power from said power take-off means.

15. A rotatable shaft for transmitting power, a clutch on said shaft for interrupting the delivery of power, an optionally operable half revolution clutch driven from said shaft, and a connection between said clutches whereby the position of said first clutch is optionally controlled through the operation of said half revolution clutch.

16. A rotatable shaft for transmitting power, a clutch on said shaft for interrupting the delivery of power, an optionally operable half revolution clutch driven from said shaft, and a connection between said clutches whereby said first clutch is adapted to be thrown into and out of operation at will by the operation of said half revolution clutch.

17. In a machine of the class described, in combination, a tractor having an engine, an implement propelled by the tractor, a rotatable shaft driven by said engine for transmitting power to said implement, a clutch on said shaft for interrupting the delivery of power, an optionally operable half revolution clutch driven from said shaft for transmitting power to the implement, and a connection between said clutches whereby the position of said first clutch is optionally controlled through the operation of said half revolution clutch.

THEOPHILUS BROWN.